Patented Oct. 2, 1945

2,386,037

UNITED STATES PATENT OFFICE 2,386,037

PROCESS FOR THE PREPARATION OF THE SODIUM SALT OF 4,4'-DIAMINODIPHENYL-SULPHONE - N - N' - DIGLUCOSESULPHON-IC ACID

André Demolis, Zofingen, Switzerland, assignor to Aktiengesellschaft vormals B. Siegfried, Zofingen, Switzerland No Drawing. Application January 11, 1944, Serial No. 517,902

In Switzerland January 21, 1943

1 Claim. (Cl. 260—211)

The present invention concerns a process for the manufacture of the sodium salt of 4,4'-diaminodiphenylsulphone-N-N'-diglucosesulphonic acid by condensing 4.4'-diaminodiphenylsulphone with 2 gramme molecules of the sodium salt of glucose sulphurous acid. The reaction is advantageously effected at elevated temperatures and in the presence of an alcohol as for example methanol as a solvent. By addition of some ammonium chloride it may be accelerated. The product of condensation is a white powder which is readily soluble in water.

The solution of the product of condensation in water is stable when it is prepared with addition of an aldose as for example glucose.

*Example*

6.1 g. 4.4'-diaminodiphenylsulphone are boiled under reflux together with 14 g. of the sodium salt of glucose sulphurous acid and 0.1 g. ammonium chloride in 130 ccm. of ethanol during 20 hours. The solution is then filtered and poured with stirring in a mixture of 500 ccm. ether and 500 ccm. methanol. The white precipitate is filtered by suction and dried.

One obtains the product of the condensation of 1 gramme molecule 4.4'-diaminodiphenylsulphone with 2 gramme molecules of the sodium salt of glucose sulphurous acid which is readily soluble in water.

What I claim is:

The method of producing the sodium salt of 4.4'-diaminodiphenylsulphone-N - N' - diglucosesulphonic acid comprising boiling together under reflux about 6.1 grams of 4.4'-diaminodiphenylsulphone with about 14 grams of the sodium salt of glucose sulphurous acid and about 0.1 gram of ammonium chloride in about 130 ccm. of methanol for about 20 hours, filtering the solution, mixing the solution with about 500 ccm. of ether and about 500 ccm. of methanol, and filtering out the white precipitate.

ANDRÉ DEMOLIS.